United States Patent [19]

Couture

[11] Patent Number: 4,951,923
[45] Date of Patent: Aug. 28, 1990

[54] ELECTRICAL WIRE GUIDE TEMPORARILY PLACED IN AN ELECTRICAL WIRING JUNCTION BOX TO PROTECT THE INSULATION OF ELECTRICAL WIRES BEING GUIDED AND PULLED INTO THIS BOX AND THROUGH A CONDUIT TO THE NEXT JUNCTION BOX

[76] Inventor: Richard P. Couture, 1715 S. Washington, Tacoma, Wash. 98405

[21] Appl. No.: 407,221

[22] Filed: Sep. 14, 1989

[51] Int. Cl.$^5$ ............................................. B65H 59/00
[52] U.S. Cl. ............................................. 254/134.3 R
[58] Field of Search ...................... 141/331, 337, 382; 174/135; 254/134.3 R, 134.3 FT

[56] References Cited

U.S. PATENT DOCUMENTS

| | | | |
|---|---|---|---|
| 3,005,620 | 10/1961 | Trunnell | 254/134.3 R |
| 3,211,195 | 10/1965 | Porter | 141/337 |
| 3,324,906 | 6/1967 | Chu | 141/337 |
| 4,132,665 | 1/1979 | Nelson | 254/134.3 R |
| 4,706,719 | 11/1987 | Eversdijk | 141/337 |

Primary Examiner—Robert C. Watson
Attorney, Agent, or Firm—Roy E. Mattern, Jr.

[57] ABSTRACT

When insulated electrical wires are to be drawn into electrical junction boxes and beyond through metal electrical conduit boxes, an electrical wire guide, made of plastic, serves to first guide the hook end of a metal fish tape out of a junction box, and then to guide its return carrying with it one or more insulated electrical wires through the electrical metal conduit to the next junction box. The electrical wire guide directs the insulated electrical wire or wires into and out of the electrical junction box without these wires making any direct contact with the junction box. The electrical wire guide has several integral portions in the order of: a top hollow cylindrical exit portion guiding the wire or wires directly into the conduit, where the conduit is secured to the junction box; a slightly tapered hollow guiding portion which remains essentially in line with the electrical conduit; a slightly tapering, guiding, bending, hollow portion to redirect the electrical insulated wire or wires en route from outside the junction box; and a slightly tapering, guiding, receiving, and positioning portion, to receive the insulated electrical wire or wires, while this receiving portion firmly contacts the bottom edge of the junction box to hold this electrical wire guide in place.

6 Claims, 3 Drawing Sheets

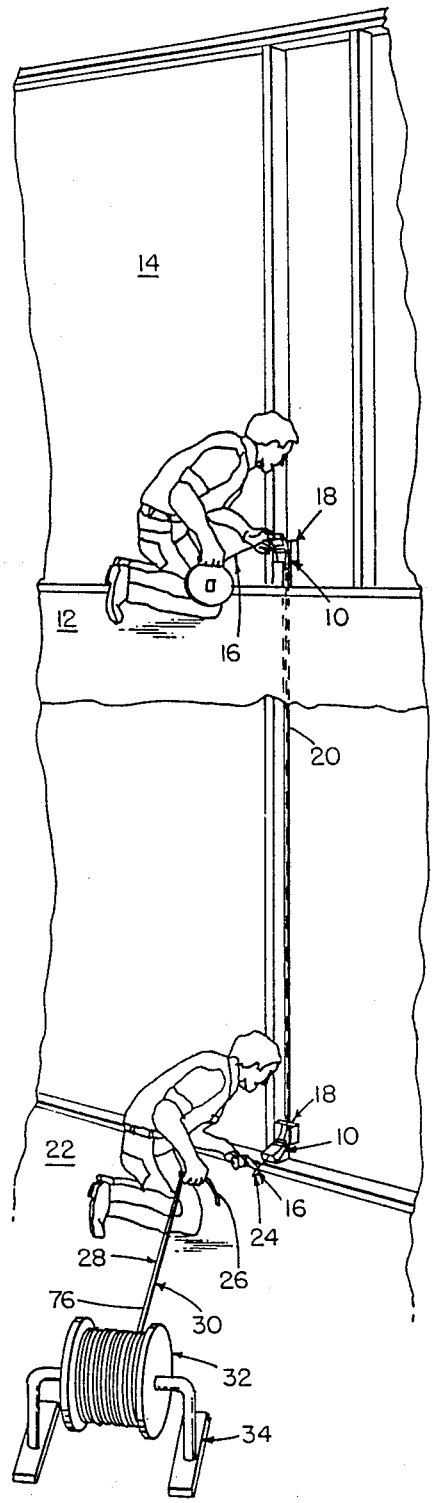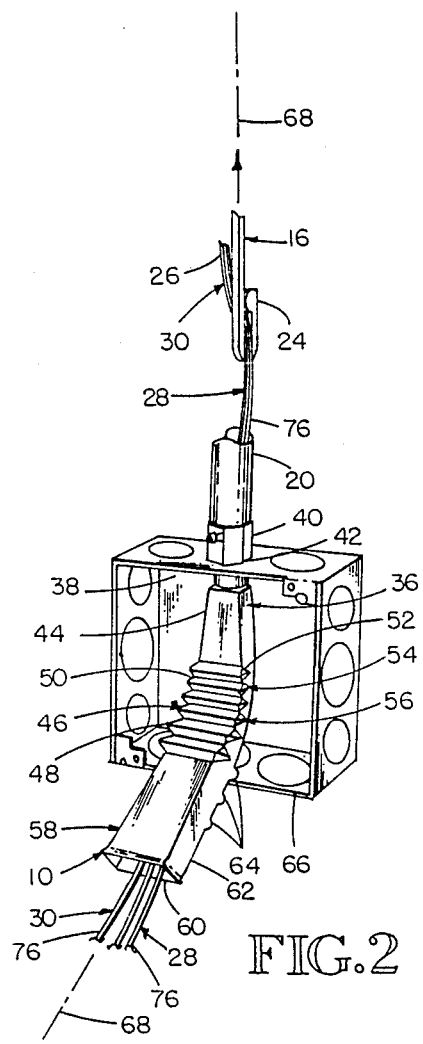

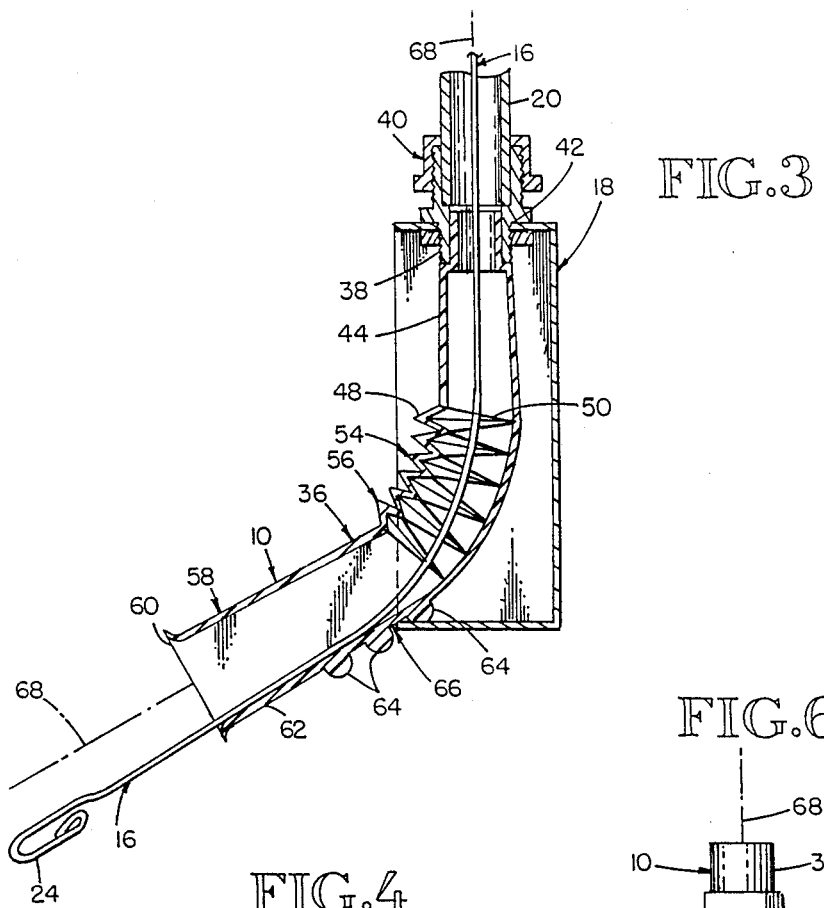
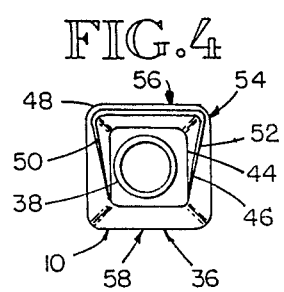
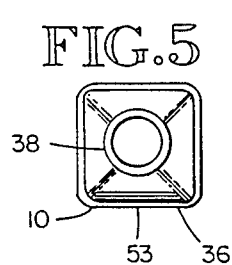
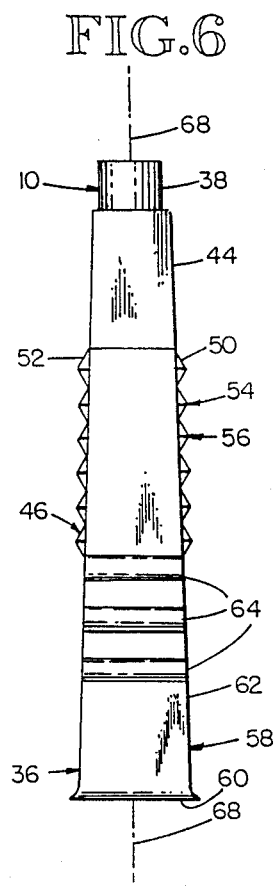

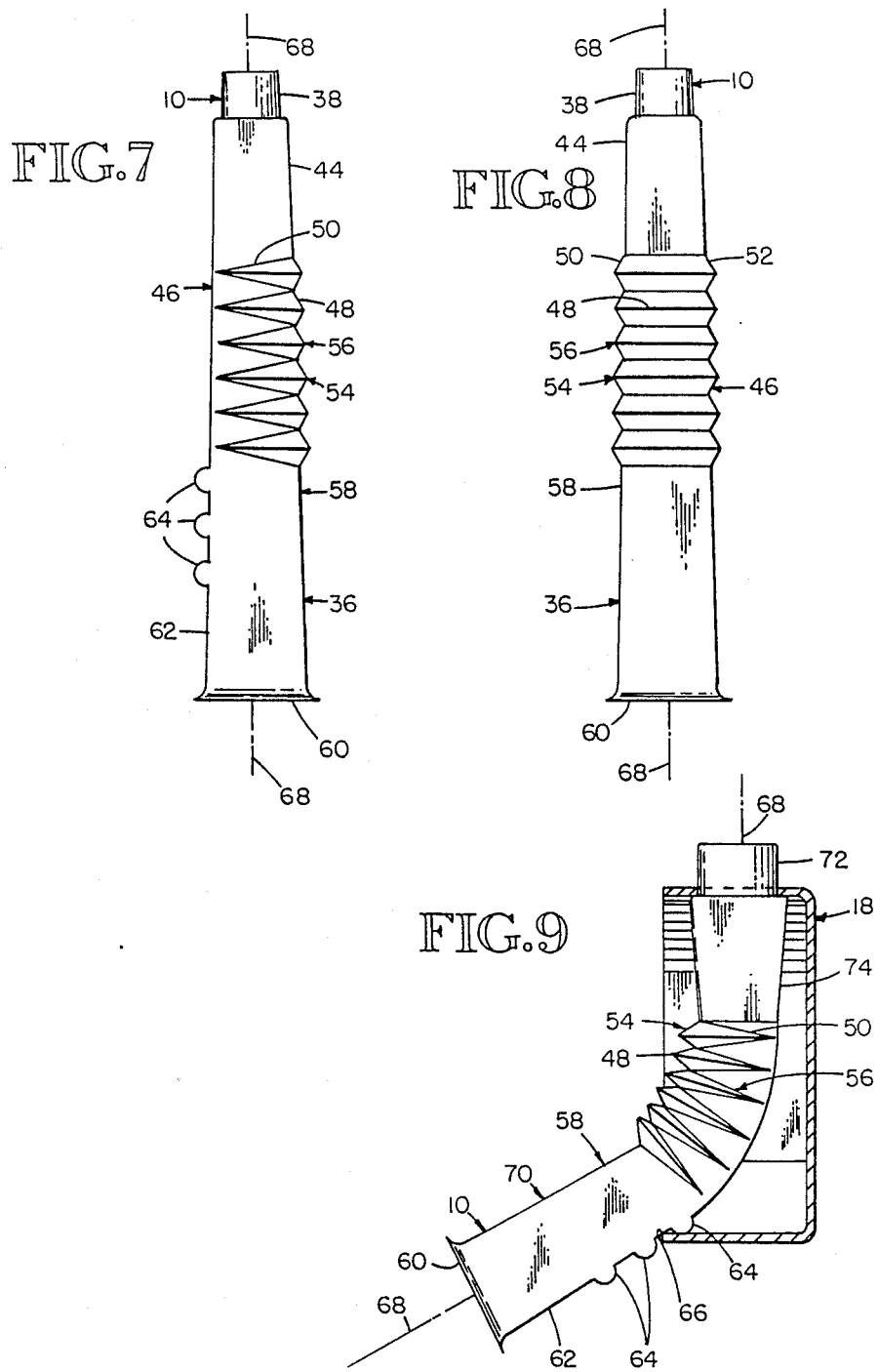

ELECTRICAL WIRE GUIDE TEMPORARILY PLACED IN AN ELECTRICAL WIRING JUNCTION BOX TO PROTECT THE INSULATION OF ELECTRICAL WIRES BEING GUIDED AND PULLED INTO THIS BOX AND THROUGH A CONDUIT TO THE NEXT JUNCTION BOX

BACKGROUND

When an electrical fish tape is guided through one electrical junction box and on into an electrical metal conduit to reach the location of another electrical junction box, on occasions this fish tape is hindered in its passage. Oftentimes the fish tape gets caught on the electrical junction box. Then when one or more insulated wires are secured to the hook end of the metal fish tape, and the metal fish tape is pulled back through the metal conduit, resistance is often encountered, which oftentimes results in the insulation becoming damaged which surrounds the electrical wires.

Persons pulling electrical wires have provided some means to better guide an insulated electrical wire or group of such wires into an electrical junction box. They have used metal and plastic sheets, which they formed into partial guiding surfaces, or grooves. However, it is not believed that persons have designed a reusable tool or guide, which is used to guide an insulated electrical wire, or a group of insulated electrical wires, with or without using a metal fish tape, through the interior of an electrical junction box, and beyond through an electrical conduit, to reach another electrical junction box.

SUMMARY

An electrical wire guide, preferably made of flexible plastic, which is blow molded, serves to guide one or more insulated electrical wires into and out of an electrical wiring junction box, which is one selected from many types, as this guided insulated electrical wire or group of guided electrical wires are being pulled through a metal conduit or like protective tube or pipe, using a fish tape, to reach another electrical wiring junction box. When this electrical wire guide is viewed as temporarily installed in a junction box, at its top is an integral hollow cylindrical exit portion, which is inserted up into the starting portion of an electrical conduit, which in turn is secured by a surrounding clamp, to the top of the electrical junction box, about the top opening thereof. Below this hollow cylindrical exit portion, is an integral slightly tapered hollow guiding portion over twice the length of the hollow cylindrical exit portion, which remains essentially in line with the electrical conduit. Then below this integral tapered hollow guiding portion is an integral continuing slightly tapering and guiding hollow portion, which is slightly longer and which is also a bending portion, having front and side accordion like integral closely spaced pleats, whereby, upon movement of the pleats, the electrical wire guide centered axis is redirected to become located outside of the electrical junction box. Thereafter, below this continuing slightly tapering, guiding, bending, hollow portion, is an integral continuing slightly tapering, guiding, receiving, and positioning hollow portion, which is slightly longer and which has an entry for receiving the insulated electrical wires, and which has a planar back side, interrupted in the upper half thereof, by spaced transverse position determining abutments, one of which is optionally selected to bear against the interior bottom transverse edge of a particularly selected type of an electrical junction box, to thereby hold this electrical wire guide temporarily in place with respect to the electrical junction box. This wire guide so remains in position during the pulling time for guiding the insulated electrical wires into and through and out of the electrical junction box and on into the electrical conduit. Preferably, this electrical wire guide is timely installed to initially serve in guiding a metal fish tape, which is to leave an electrical conduit and to otherwise pass into an electrical junction box and beyond, to be hooked to the insulated wires to be drawn back through the electrical conduit as the metal fish tape is retrieved. When the electrical wire guide is installed first, the hooked end of the metal fish tape is more conveniently guided out from the conduit, then through the electrical wire guide, which has been in part placed within the junction box, and thereafter beyond this electrical wire guide, to be then connected to one or more insulated electrical wires, soon to be pulled through the metal conduit upon the retraction of the metal fish tape. Overall times of pulling insulated electrical wires are reduced, and the insulation of the wires is not damaged, when these electrical wire guides are utilized.

DRAWINGS

The electrical wire guide temporarily placed in an electrical junction box, to primarily protect the insulation of electrical wires being guided and pulled through this electrical junction box and on through a conduit to the next junction box, is illustrated in the drawings, wherein:

FIG. 1 is a partial perspective view of two floors of a building under construction, showing a person feeding a metal fish tape from the floor above, through a temporarily installed electrical wire guide, placed in an electrical junction box, then down through an electrical conduit to another electrical junction box located on the floor below, where another electrical wire guide has been temporarily installed, and which guides the metal fish tape out into the room to have the hook thereof fastened to one or more insulated electrical wires, by another person on the floor below, to be later pulled back up through all these members to reach the floor above;

FIG. 2 is a perspective view of an electrical junction box in which an electrical wire guide has been temporarily installed and the hook end of a metal fish tape and the metal fish tape have been guided from a conduit, through the electrical wire guide, and therefore indirectly through the electrical junction box, and beyond into an open area, where one or more insulated electrical wires have been secured to the hook, and the hook with the insulated wires and the metal fish tape are being pulled back through these members;

FIG. 3 a partial side cross-sectional view, showing again the members shown in FIG. 2, and indicating the temporary insertion of the electrical wire guide, and the positioning of the hook end of the metal fish tape, which has been passed through the conduit and the electrical wire guide, and illustrating how the front and side accordion like integral closely spaced pleats deflect to accommodate the bending of the electrical wire guide, and how one of the back transverse positioning determining abutments of the electrical wire guide is bearing against the interior bottom transverse edge of the electrical junction box, thereby holding the electrical wire guide in place;

FIG. 4 is a top view of the electrical wire guide, before any deflection thereof, especially indicating the top hollow cylindrical exit portion and the front and side accordion like integral closely spaced pleats;

FIG. 5 is a bottom view of the electrical wire guide, before any deflection thereof, especially indicating the tapering interior thereof;

FIG. 6 is a back view of the electrical wire guide, before any deflection thereof, especially indicating the spaced transverse position determining abutments, one of which is eventually selected to bear against the interior bottom transverse edge of a particularly selected type of an electrical junction box, to hold the electrical wire guide in place;

FIG. 7 is a right side view of the electrical wire guide, before any deflection thereof, and the left side view would be a mirror image, especially showing the relative positions of the group of accordion like integral closely spaced pleats, and the group of spaced transverse position determining abutments;

FIG. 8 is a front view of the electrical wire guide, before any deflection thereof, especially illustrating the group of accordion like integral closely spaced pleats, which accommodate the bending of the installed electrical wire guide; and;

FIG. 9 is a partial sectional side view of another electrical wire guide, which is larger to accommodate larger diameter conduits and larger diameter groups of larger diameter electrical insulated wires, indicating how it is installed in an electrical junction box, with the larger diameter integral hollow cylindrical exit in position at the top of the electrical junction box, and with one of the spaced transverse positioning determining abutments bearing against the interior bottom transverse edge of the electrical junction box to hold this larger electrical wire guide in place.

DESCRIPTION OF THE PREFERRED EMBODIMENTS

In FIGS. 1 through 8, one preferred smaller embodiment of the electrical wire guide 10 is illustrated, which makes insulated electrical wire pulling more efficiently undertaken and the insulation on the wires is not damaged. The use of this electrical wire guide, in any selected size embodiment, makes one person pulling of insulated wires a comparatively easy task. Ceiling pulls, blind pulls and series of electrical junction boxes pulls are all made easier. Utilization of an electrical wire guide 10 assists a person in untangling stranded wire, and eliminates any possible call back to an installation job, because an insulated wire might otherwise had been damaged during insulation electrical wire pulling operations.

This electrical wire guide 10 is used with essentially all electrical junction boxes, such as: handi-box, 4-0 box, 4-5 box, with mud ring, single gang or double gang, deep box, or combination boxes. They are temporarily used for each pulling time, and are reused for many pulling times.

By way of example, in FIG. 1, a person is shown on an upper floor 12 of a dwelling 14, feeding a metal fish tape 16 into an electrical wire guide 10 installed in an electrical junction box 18, and beyond into an electrical conduit 20 to reach a lower floor 22. At this lower location, the hook end 24 of metal fish tape 16 is guided through another electrical wire guide 10, which is installed in another electrical junction box 18. The hook end 24 is moved beyond into the dwelling 14, as shown in both FIGS. 1 and 3. Then a person at the lower floor 22 of the dwelling 14, attaches the leading ends 26 of a group 28 of insulated electrical wires 30, being pulled from a reel 32 of wires 30 rotatably supported on a stand 34, to the hook end 24 of the metal fish tape 16. Then the person on the upper floor 12 retrieves the metal fish tape and pulls the wires 30. As shown in FIG. 2, this group 28 of insulated electrical wires 30, on the route back, have been guided through the electrical wire guide 10, positioned in the electrical junction box 18, and on into the electrical conduit 20.

As shown in FIGS. 2, 3, 4, 6, 7, and 8, this smaller embodiment 36 of the electrical wire guide 10 has at the top thereof a top integral hollow cylindrical exit portion 38, which is inserted up into the starting portion of an electrical conduit 20. At this locale, the electrical conduit 20 is secured by a surrounding clamp 40 to the top of the electrical junction box 18, about the top opening 42 thereof.

Below this top integral hollow cylindrical exit portion 38, the electrical wire guide 10 has an integral slightly tapered hollow guiding portion 44, which has a length over twice the length of the top integral hollow cylindrical exit portion 38, and which upon installation of the electrical wire guide remains essentially in line with the electrical conduit 20, as shown in FIGS. 2 and 3.

Then below this integral tapered hollow guiding portion 44, there is an integral continuing slightly tapering, guiding and bending portion 46, which is slightly longer than the integral tapered hollow guiding portion 44. The bending capability of this integral portion 46, is provided by having front pleats 48, left side pleats 50, and right side pleats 52, arranged in spaced alignments, to create an overall accordion like integral closely spaced group 54 of complete pleats 56, as shown in FIGS. 2, 3, 6, 7, and 8. As this bending portion 46 is so formed into a bending configuration as shown in FIGS. 1, 2, and 3, the centerline of this smaller embodiment 36 of an electrical wire guide 10 is directed clear of the interior of an electrical junction box 18.

Thereafter, below this integral continuing slightly tapering guiding, and bending portion 46, there is a slightly longer integral continuing, slightly tapering, guiding, receiving, and positioning hollow portion 58, which completes the integral electrical wire guide 10 in this smaller embodiment 36, shown in FIGS. 1 through 8. This hollow portion 58 has an entry 60 for receiving insulated electrical wires 30. Also on this hollow portion 58 there is a planar back side 62, interrupted in the upper half thereof by integral spaced transverse position determining abutments 64. When an electrical wire guide 10 is installed, one of these abutments 64 is optionally selected to bear against the interior bottom transverse edge 66 of a particularly selected type of an electrical junction box 18, as illustrated in FIGS. 2 and 3.

This electrical wire guide 10 remains in the temporarily installed position thereof, as shown in FIGS. 1, 2, and 3, during the entire pulling operational time for guiding the insulated electrical wires 30 into and through and out of the electrical junction box 18, and on into the electrical conduit 20.

Preferably, as shown in FIG. 1, this electrical wire guide is initially timely installed with others, to initially serve in guiding a metal fish tape 16. These fish tapes 16 are initially guided into an electrical conduit 20 through an electrical wire guide 10, installed in an electrical junction box 18, for example on the floor above, as shown in FIG. 1. They are then pushed on down through the electrical conduit 20, into the other electrical wire guide 10, temporarily installed in the electrical junction box 18 on the lower floor 22. They are then pushed into the room a sufficient distance, so their hook ends 24 are conveniently temporarily connected to the leading ends 26 of one or more insulated electrical wires 30. Thereafter, these insulated electrical wires 30 are conveniently and safely pulled through the respective electrical wire guides 10, electrical junction boxes 18, and electrical conduits 20 throughout a dwelling 14 under construction, or being remodeled.

After the electrical wire guide 10 has been manufactured out of a plastic, to become semi-flexible and bendable, such a plastic being a low density polyethylene plastic, which is formed in a blow molding process, the overall centerline thereof continues straight through, as illustrated in FIGS. 4, 5, 6, 7, and 8. Only during the installation procedure does the overall centerline thereof 68 become curved, upon the bending of the integral slightly tapering guiding and bending portion 46. Thereafter, when the electrical wire guide 10 is removed from the temporary guiding position, the overall centerline 68 tends to return to the initial straight through position thereof, via the memory of the plastic material used in fabricating this electrical wire guide 10. In this way, the electrical wire guide 10, may be used many times, as the selected transverse positioning abutment 64 thereof always remains in positioning contact with an interior bottom transverse edge 66 of an electrical junction box 18.

These electrical wire guides 10 are manufactured in sizes like the smaller embodiment 36, illustrated in FIGS. 1 through 8, and the larger embodiment 70, shown in FIG. 9. Essentially in a larger embodiment 70, the top integral hollow cylindrical exit portion 72 is larger in diameter, and the adjacent integral tapered hollow guiding portion 74 is reversely tapered, in reference to guiding portion 44 of the smaller embodiment 36. The functions of all the respective integral portions remain the same throughout all the embodiments 36, 70, and others not illustrated. All the integral continuing slightly tapering guiding, receiving, and positioning portions 58 have an essentially planar back side 62 to keep the respective electrical wire guide 10 from turning about its own axis.

All the embodiments, when properly used, prevent any damage to the insulation 76 of insulated electrical wires 30. Also an indirect but important advantage is gained, when persons engaged in pulling these insulated wires 30 are protected from being cut, by the presence of these electrical wire guides. Previously persons contacted the often sharp edges of some of the electrical junction boxes 18. Also persons using these electrical wire guides 10 tend to accomplish their wire pulling tasks during shorter periods of time.

I claim:

1. An electrical wire guide to be temporarily placed in an electrical wiring junction box to protect the insulation of electrical wires being guided and pulled into this junction box and on through an electrical conduit to the next junction box, comprising, the integral arrangement of:
   (a) a top hollow cylindrical exit portion adapted for insertion into an electrical conduit;
   (b) a slightly tapered hollow guiding portion which tends to remain essentially in line with the top hollow cylindrical exit portion;
   (c) a continuing slightly tapered, guiding, and bendable hollow portion, commencing initially in line with the top hollow cylindrical exit portion, and after bending no longer being in line in part with the top hollow cylindrical exit portion;
   (d) a continuing slightly tapered, guiding, receiving, and positioning hollow portion commencing initially in line with the top hollow cylindrical exit portion, and then after bending of the continuing slightly tapered guiding and bendable hollow portion, no longer being in line with the top hollow cylindrical exit portion, then being in a position to receive insulated electric wires and to guide these wires through this electrical wire guide, when the wire guide is positioned in an electrical wiring junction box, and thereafter continue to guide these insulated electrical wires into an electrical conduit; and wherein this continuing slightly tapered, guiding, receiving, and positioning hollow portion has an essentially planar back side, having, in turn, spaced transverse position determining abutments, one of which is optionally selected to bear against an interior bottom transverse edge of a particularly selected type of an electrical junction box, to thereby hold this electrical wire guide temporarily in place with respect to this selected electrical junction box.

2. An electrical wire guide to be temporarily placed in an electrical wiring junction box to protect the insulation of electrical wires being guided and pulled into this junction box and on through an electrical conduit to the next junction box, comprising, the integral arrangement of:
   (a) a top hollow cylindrical exit portion adapted for insertion into an electrical conduit;
   (b) a slightly tapered hollow guiding portion which tends to remain essentially in line with the top hollow cylindrical exit portion;
   (c) a continuing slightly tapered, guiding, and bendable hollow portion, commencing initially in line with the top hollow cylindrical exit portion, and after bending no longer being in line in part with the top hollow cylindrical exit portion; and
   (d) a continuing slightly tapered, guiding, receiving, and positioning hollow portion commencing initially in line with the top hollow cylindrical exit portion, and then after bending of the continuing slightly tapered guiding and bendable hollow portion, no longer being in line with the top hollow cylindrical exit portion, then being in a position to receive insulated electric wires and to guide these wires through this electrical wire guide, when the wire guide is positioned in an electrical wiring junction box, and thereafter continue to guide these insulated electrical wires into an electrical conduit; and the continuing slightly tapered, guiding, and bendable hollow portion has a front and opposite side portions thereof having accordion like integral closely spaced pleats, whereby upon the overall bending movement of these pleats, the electrical wire guide centered axis is redirected to become located outside of the electrical junction box; and the continuing slightly tapered, guiding, receiving, and positioning hollow portion has an essentially planar back side, having, in turn, spaced transverse position determining abutments, one of which is optionally selected to bear against an interior bottom transverse edge of a particularly selected type of an electrical junction box, to thereby hold this electrical wire guide temporarily in place with respect to this selected electrical junction box.

3. An electrical wire guide to be temporarily placed in an electrical wiring junction box to protect the insulation of electrical wires being guided and pulled into this junction box, comprising, the integral arrangement of:
   (a) a top exit hollow portion adapted for insertion through a top hole of an electrical wiring junction box;
   (b) a guiding hollow portion adjacent to and in line with the top exit portion;
   (c) a guiding and bendable hollow portion adjacent to the guiding hollow portion; and
   (d) a guiding, receiving and positioning portion adjacent the guiding and bendable hollow portion, adapted in part to bear against an interior bottom transverse edge of an electrical junction box; and
   this guiding, receiving and positioning portion has an essentially planar back side, having, in turn, spaced transverse position determining abutments, one of which is optionally selected to bear against an interior bottom transverse edge of an electrical junction box.

4. An electrical wire guide to be temporarily placed in an electrical wiring junction box to protect the insulation of electrical wires being guided and pulled into this junction box, comprising, the integral arrangement of:
   (a) a top exit hollow portion adapted for insertion through a top hole of an electrical wiring junction box;
   (b) a guiding hollow portion adjacent to and in line with the top exit portion;
   (c) a guiding and bendable hollow portion adjacent to the guiding hollow portion; and
   (d) a guiding, receiving and positioning portion adjacent the guiding and bendable hollow portion, adapted in part to bear against an interior bottom transverse edge of an electrical junction box; and
   the guiding and bendable hollow portion has accordion like pleats, whereby upon the bending movement of these pleats, portions of this electrical wire guide become located outside of an electrical junction box; and
   the guiding, receiving and positioning portion has an essentially planar back side, having, in turn, spaced transverse position determining abutments, one of which is optionally selected to bear against an interior bottom transverse edge of an electrical junction box.

5. An electrical wire guide to be temporarily placed in an electrical wiring junction box to protect the insulation of electrical wires being guided and pulled into this junction box, comprising, the integral arrangement of:
   (a) a top exit hollow portion adapted for insertion through a top hole of an electrical wiring junction box;
   (b) a guiding hollow portion adjacent to and in line with the top exit portion;
   (c) a guiding and bendable hollow portion adjacent to the guiding hollow portion; and
   (d) a guiding, receiving and positioning portion adjacent the guiding and bendable hollow portion, adapted in part to bear against an interior bottom transverse edge of an electrical junction box; and
   this guiding, receiving, and positioning portion has an essentially planar back side, having, in turn, a position determining abutment to bear against an interior bottom transverse edge of an electrical junction box.

6. An electrical wire guide to be temporarily placed in an electrical wiring junction box to protect the insulation of electrical wires being guided and pulled into this junction box, comprising, the integral arrangement of:
   (a) a top exit hollow portion adapted for insertion through a top hole of an electrical wiring junction box;
   (b) a guiding hollow portion adjacent to and in line with the top exit portion;
   (c) a guiding and bendable hollow portion adjacent to the guiding hollow portion; and
   (d) a guiding, receiving and positioning portion adjacent the guiding and bendable hollow portion, adapted in part to bear against an interior bottom transverse edge of an electrical junction box; and
   the guiding and bendable hollow portion has accordion like pleats, whereby upon the bending movement of these pleats, portions of this electrical wire guide become located outside of an electrical junction box; and
   the guiding, receiving, and positioning portion has an essentially planar back side, having, in turn, a position determining abutment to bear against an interior bottom transverse edge of an electrical junction box.

* * * * *